United States Patent [19]

Bowden

[11] Patent Number: 4,519,011

[45] Date of Patent: May 21, 1985

[54] POWER CONTROL CIRCUIT

[75] Inventor: Edgar A. Bowden, Arlington, Tex.

[73] Assignee: Mobil Oil Corporation, New York, N.Y.

[21] Appl. No.: 338,175

[22] Filed: Jan. 8, 1982

[51] Int. Cl.³ .......................... G11B 5/00; G11B 31/00
[52] U.S. Cl. ........................................ 360/137; 360/6; 360/71
[58] Field of Search .................... 307/34, 38, 126, 140; 360/72.1, 71, 6, 74.5, 78, 137

[56] References Cited

U.S. PATENT DOCUMENTS

| 2,911,161 | 11/1959 | Proctor | 360/78 |
| 4,205,354 | 5/1980 | Kramer | 360/72.1 |
| 4,225,890 | 9/1980 | Takenaka et al. | 360/71 |
| 4,302,784 | 11/1984 | Mussat | 360/71 |

Primary Examiner—Raymond F. Cardillo, Jr.
Assistant Examiner—Paul Stefanski
Attorney, Agent, or Firm—A. J. McKillop; Michael G. Gilman; Frank J. Kowalski

[57] ABSTRACT

An electronic power control circuit used in recording seismic data at unmanned remote locations is disclosed wherein the power requirements are minimized by segregating power distribution between continuous and non-continuous requirements.

6 Claims, 7 Drawing Figures

POWER CONTROL CIRCUIT

BACKGROUND OF THE INVENTION

The present invention pertains to apparatus used in seismic exploration and more particularly to apparatus used in the collection of seismic acoustic pulses at a point remote from the generation of seismic acoustic pulses.

In most seismic exploration, an acoustic pulse generator is used to transmit acoustic pulse into the earth's subsurface formations. Whenever an acoustic pulse is incident upon a less dense/more dense interface, a portion of this pulse is reflected back to the surface while the remainder continues on its path prior to incidence or refracted along the formation. The refracted portion may travel along the formation and emerge as an acoustic pulse traveling in the same direction as the reflected wave. The reflected and refracted portions of the transmitted acoustic pulses are detected by geophones or the like which transduce the acoustic pulses to electrical signals. The electrical signals may be recorded or fed to a display such as a cathode ray tube. In general the electrical signals are recorded for further processing to remove undesireable portions. In general, the recordings of seismic data have been operator controlled. The operator rewinds the tape or record to a predetermined starting point after he or she energizes the recording unit. For undirectional recorders, a track is recorded, the tape is rewound and an additional track is recorded or a new reel of tape is installed. The operator monitors the track so that transition to additional tracks may be performed when the initial track has been completed. In some instances, recorders may record in only one direction, such as forward, but some recorders will record in reverse. In such cases, the operator must switch the recording operation not only to change tracks but to change recording direction when the end of tape (EOT) is reached.

Prior art attempts at remote operation have, in general, been limited in deployment time due to high power requirements and lack of intelligence capability.

In the present seismic exploration, rising costs have created a need for the collection of a greater amount of data for larger areas than previously obtainable. In general, seismic exploration comprises a seismic pulse generator and seismic pulse detectors. The seismic pulse generator is used to transmit acoustic pulses into the earth's formation which are reflected and refracted by subsurface formation density changes called interfaces and travel towards the surface. Seismic pulse detectors receive these reflected and refracted acoustic pulses and produce an electric signal therefrom. Often seismic detectors are located several miles from the acoustic pulse generators. Apparatus and methods for collecting data at locations remote from the generation of acoustic seismic energy is taught in copending U.S. applications Ser. No. 163,757 entitled On Bottom Seismic Electronic System. However, recording data at remote, unmanned locations presents several problems to which present technology has no readily available answers.

The first problem encountered in a remotely operated, unmanned recording unit is that of power consumption. Units capable of recording sophisticated seismic data require a substantial power supply to operate computer storage units, to drive the recording unit and to provide power for seismic signal detectors. A remote unit must be ready to record from the time it is placed in position and personnel leave. Since the lead time between deployment of the remote unit and the initiation of seismic pulse generation may be several hours, the unit will have consumed a significant amount of power prior to actual recordation.

A second problem encountered is the determination of the location on the tape where the seismic record begins. It is possible for tape cartridges to be loaded in the recorder and not be fixed at a specific starting position, namely, the beginning of the tape. As a result, much recording capability can be lost. This situation is particularly true where a plurality of remote units are being loaded in preparation for deployment.

An additional problem encountered with recording seismic data is a property of recording units capable of recording seismic data in digital format. In general, the recorder is started and records data until it reaches the end of the tape. Without personnel to change the tape or to rewind the tape, the recording is terminated.

A further problem in recording occurs if a feature wherein the tape is automatically rewound at the remote location is incorporated into the system. This problem is a determination of whether the tape is being run in the forward or reverse direction. The lack of direction sensing capability limits the possible functions of the recording unit. If, for example, a microprocessor unit is used to control the tape recorder and the tape has several tracks, the system is incapable of determining whether the tape recorder is recording or rewinding.

BRIEF DESCRIPTION OF THE DRAWINGS

FIG. 4 is a layout diagram of FIGS. 3A–3D.

SUMMARY OF THE INVENTION

The present invention concerns electronic power distribution circuits and more particularly power distribution circuits for use in recording seismic data at remote unmanned locations. A distribution circuit is provided which is connected between a power supply and a recording unit. A clock pulse generator is connected into the distribution circuit. All power requirements are segregated into essential continuous and non-continuous requirements. Essential continuous circuits are maintained in an energized state. Non-continuous circuits are maintained in a standby condition until energized at a predetermined time.

DESCRIPTION OF THE PREFERRED EMBODIMENT

Figure 1:
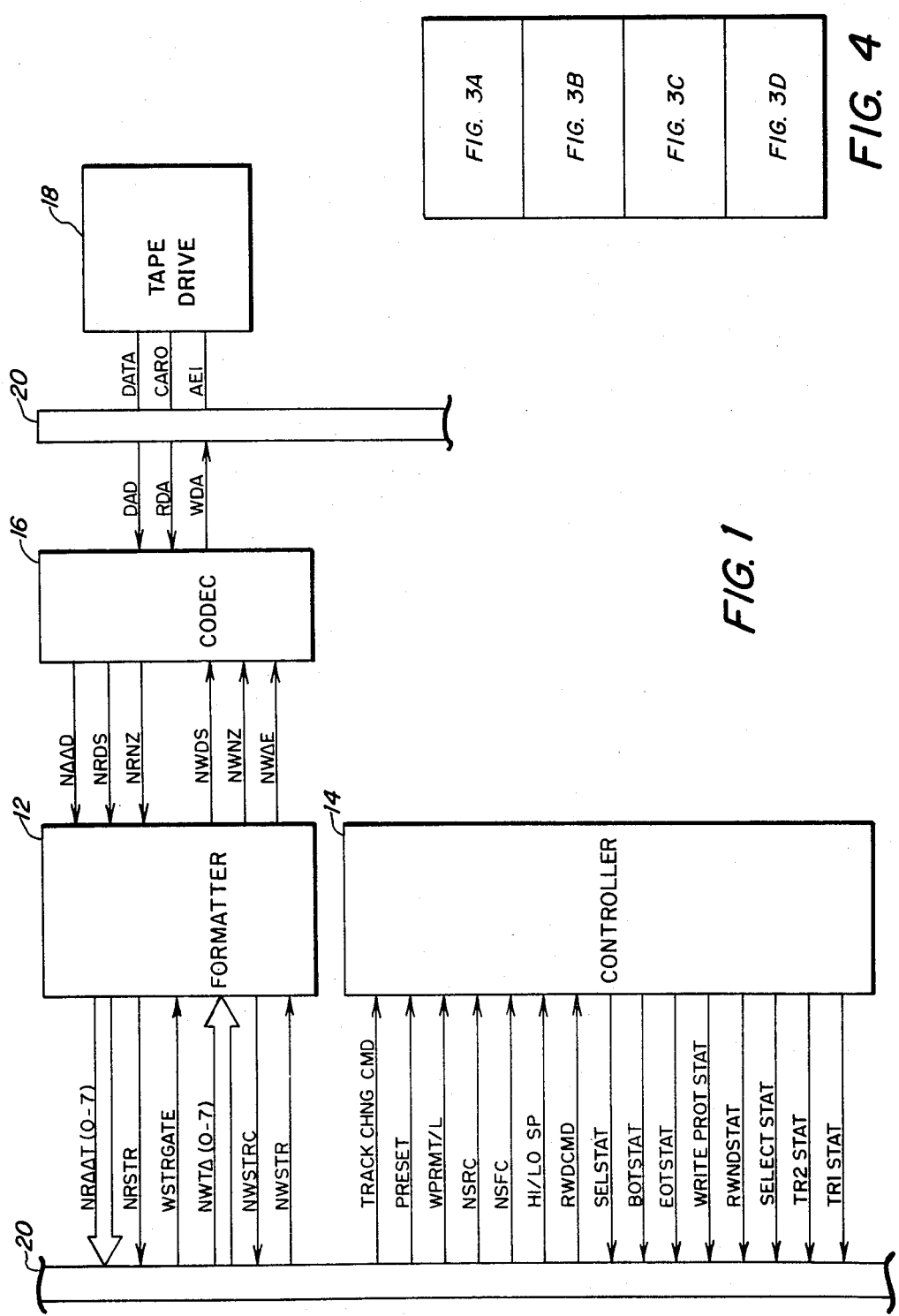
FIG. 1 is a block diagram of the intelligence of a remote recording system.
Figure 2:
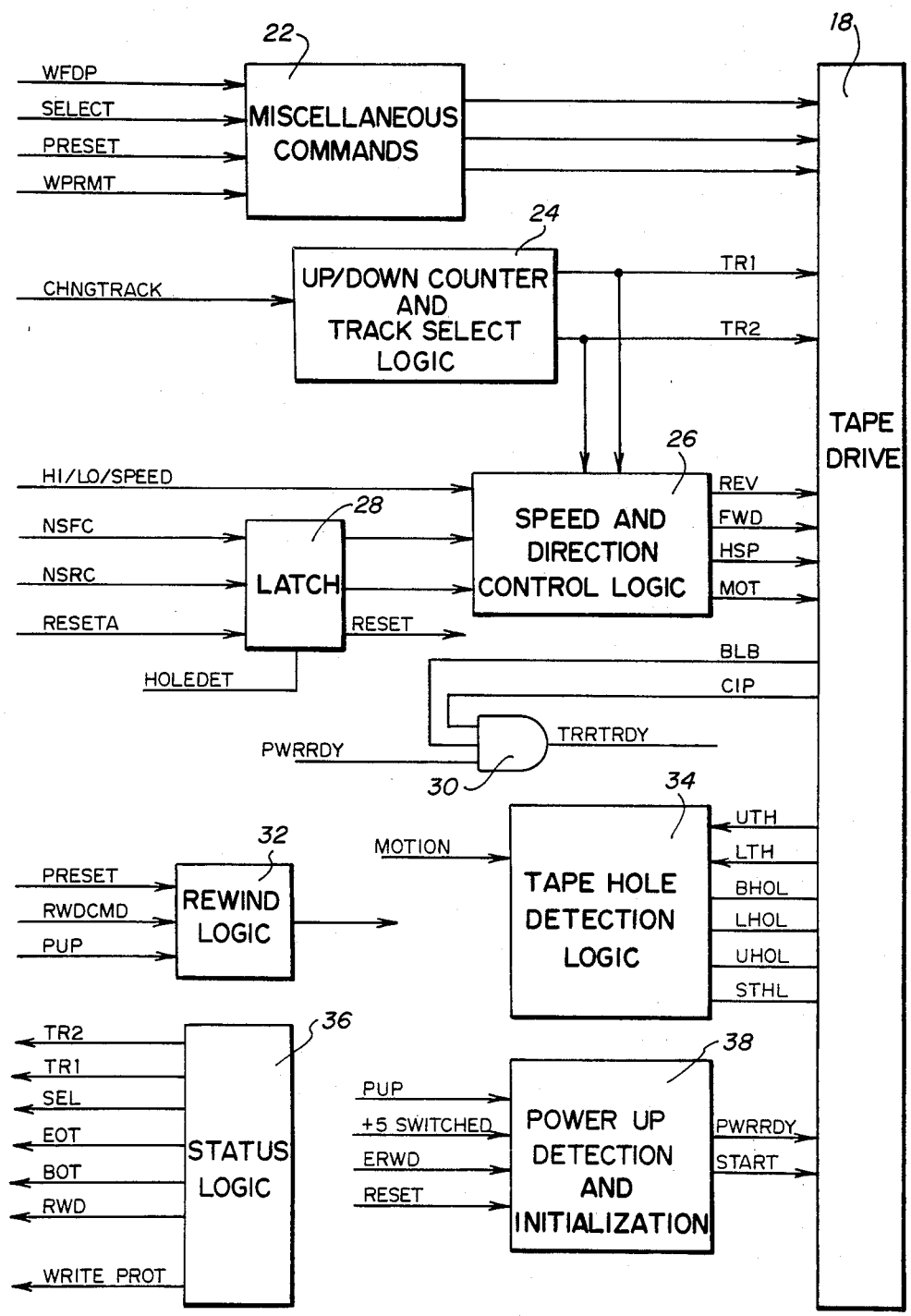
FIG. 2 is a block diagram of a portion of FIG. 1.

FIG. 1 is a block diagram of the control system for a remote unmanned seismic data recorder system. FIG. 2 is a block diagram of the controller portion of FIG. 1 illustrating its various control circuits in greater detail. FIGS. 3A through D illustrate the components of FIG. 2 in schematic form.

FIG. 1 is a block diagram which shows signal distribution in a formatter controller assembly between a formatter card, 12, a controller card 14 and a codec card 16. The inputs to the tape unit and the outputs to the tape drive are also illustrated and have alpha designations which will be discussed in detail in conjunction with FIGS. 2 and 3A–3D. The formatter 12 receives parallel data at its input and converts it to serial NRZ (non-return to zero) data which is one format frequently used in the tape industry. Formatter 12 transmits the NRZ data to codec, which is short for coder-decoder, card 16. Codec card 16 is a vendor furnished card, and takes a standard NRZ code and converts it into a proprietary code which gives rise to very high data packing density on the tape. Codec card 16 may be obtained commercially from suppliers such as Data Electronics Incorporated located in San Diego, California.

Tape drive 18 is illustrated in block form and a unit compatible with the present invention may be purchased from Data Electronics Incorporated of San Diego, Calif.

FIG. 1 illustrates controller 14 receiving input signals which are acronyms such as track change command (TRACKCHNGCMD), preset command (PRESET), write permit command (WPRMT/L), not servo reverse command (NSRC), not servo forward command, (NSFC), high and low speeds, (HI/LO/SPEED), and rewind command (RWD). Status signals which are returned to the controller are selected status, (SELSTAT) beginning of tape (BOTSTAT), end of tape (EOTSTAT), write protect status (WRITE PROTSTAT), rewind status, (RWNDSTAT) select command (SELECTSTAT) and TRI (TRISTAT) and TR2 (TR2STAT). These signals are a binary code which define which state or on which track the unit's on, and a preset command. The write permit command (WPRMT) is issued to enabling writing on the tape.

Referring now to FIG. 2, Controller card 14, which controls the motion of the tape unit, forward, reverse, high speed and low speed is illustrated in block diagram with greater detail. Controller 14 sense signals which come from drive 18 and determines information such as whether the cartridge is in place, whether the tape sensor is functional, and on which track the unit is recording. Controller 14 issues write commands, erase commands, forward, reverse, high speed, select commands and general motion commands. Controller 14 receives inputs from the external world from a connector 20 and turns those commands into signals which can be recognized by the tape drive. It also takes the sense lines or the sensors (not shown) located in the drive and converts them into logic signals which can be detected back by the whole system through terminal 20.

In FIG. 2 a block diagram of controller 14 illustrating the connections between tape drive 18 and various portions of controller 14 are shown. Miscellaneous commands circuit 22, up-down counter 24, speed and direction control logic 26, latch 28, AND gate 30, rewind logic 32, tape hole detection logic 34, status logic 36 and power up detection and initialization circuit 38 are illustrated with their various inputs and outputs.

Miscellaneous commands circuit 22 receives certain miscellaneous commands such as select, preset and write permit and are routed directly to tape drive 18. Circuit 22 is a set of line receivers and line drivers which condition the signals that are received from connector 20 and reissued or not reissued but just transferred to the tape drive (see FIG. 3A).

Up down counter 24 is a counter and a track select logic which enables the tape recorder to write on the proper track. The tape recorder used in the preferred embodiment was originally designed to operate, to record in one direction only and then rewind on another track. In a remote unmanned recording operation, such as a recorder to record data on an ocean bottom seismometer, there would be no one around to rewind the tape and it must be done automatically. Power consumption and rewinding time requirements prompted the alternative to switch the track and record in the reverse direction. When you reach the end of the tape on track one for example, the tracks being labelled 1, 2, 3 and 4, the tape recorder is switched to track 2 and records in the opposite direction. Similarly, when you reach the end of track 2, switch to track 3. The end of track is defined as the end of the tape. In essence, the model for this looks like one long piece of tape. It looks like a continuous tape except there are coded holes punched in the tape, which is standard in the industry. The preferred embodiment uses type DC 300 cartridges manufactured by 3M Company (or equivalent cartridges) having coded holes in the tape defining which end of the tape is passing the hole sensor. The objective of controller 14 is two fold. One objective is to automatically effect the change of tracks, the second objective is to design a controller which would use a little power as possible since it must be a battery operated system to be used at remote unmanned locations. There is a requirement that all the high power consuming circuits are off when they're not in use, such as servo cards, codec cards, certain logic circuits in the drive, detectors which senses the tape holes. By making controller 14 and the formatter 12 very low power circuits, the information which is contained in the units such as tape position and other status signals can be retained without turning the unit off. The system of the preferred embodiment has, in effect, two power lines coming into remote unit 10, one continuous power which would power up formatter 12 and controller 14 and another switched power line which would switch off all the other equipment which is not in operation, thus saving a great deal of energy.

Figure 3A:
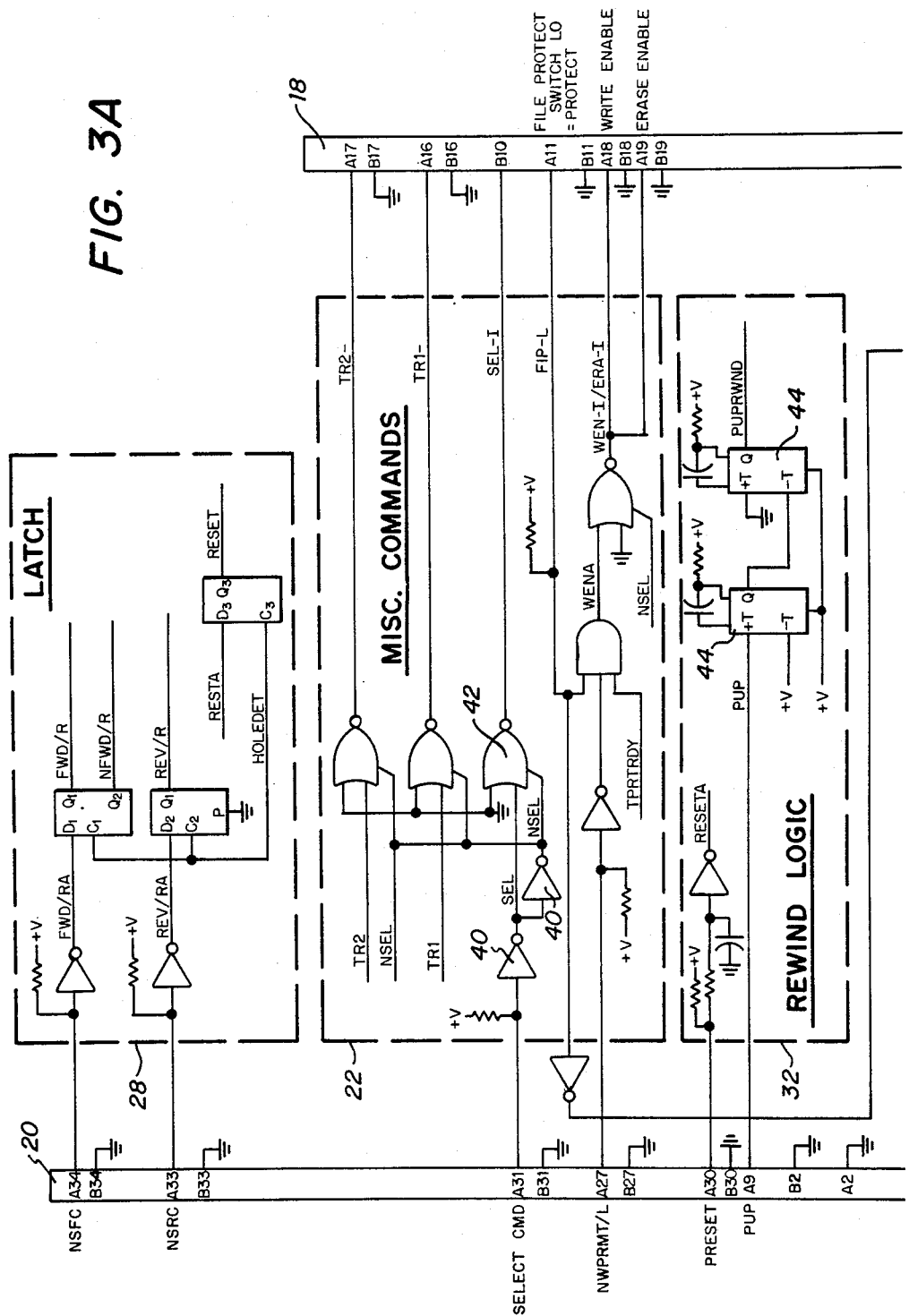
FIGS. 3A, 3B, 3C and 3D are schematic diagrams of FIG. 2.
Figure 3B:
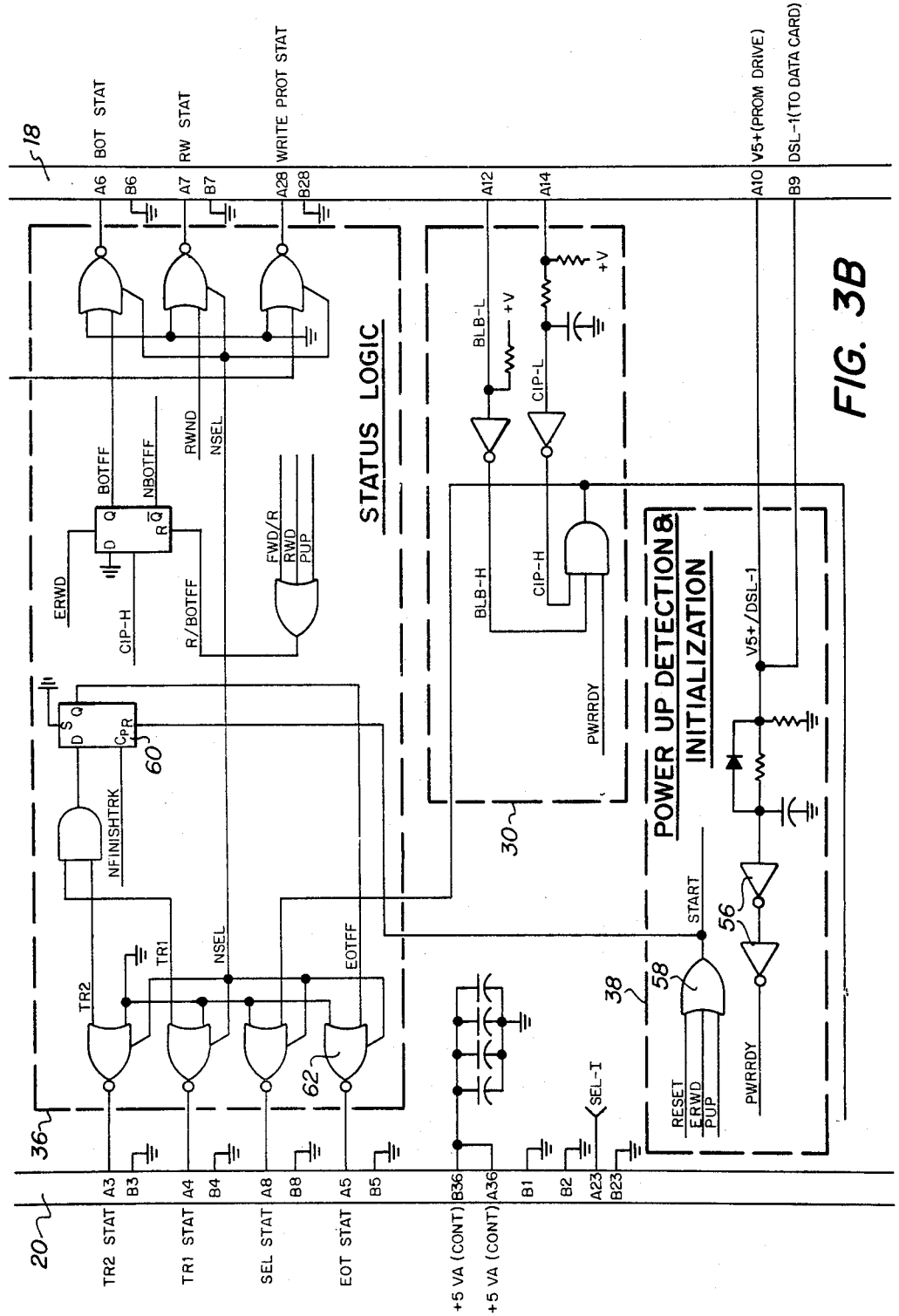
Figure 3C:
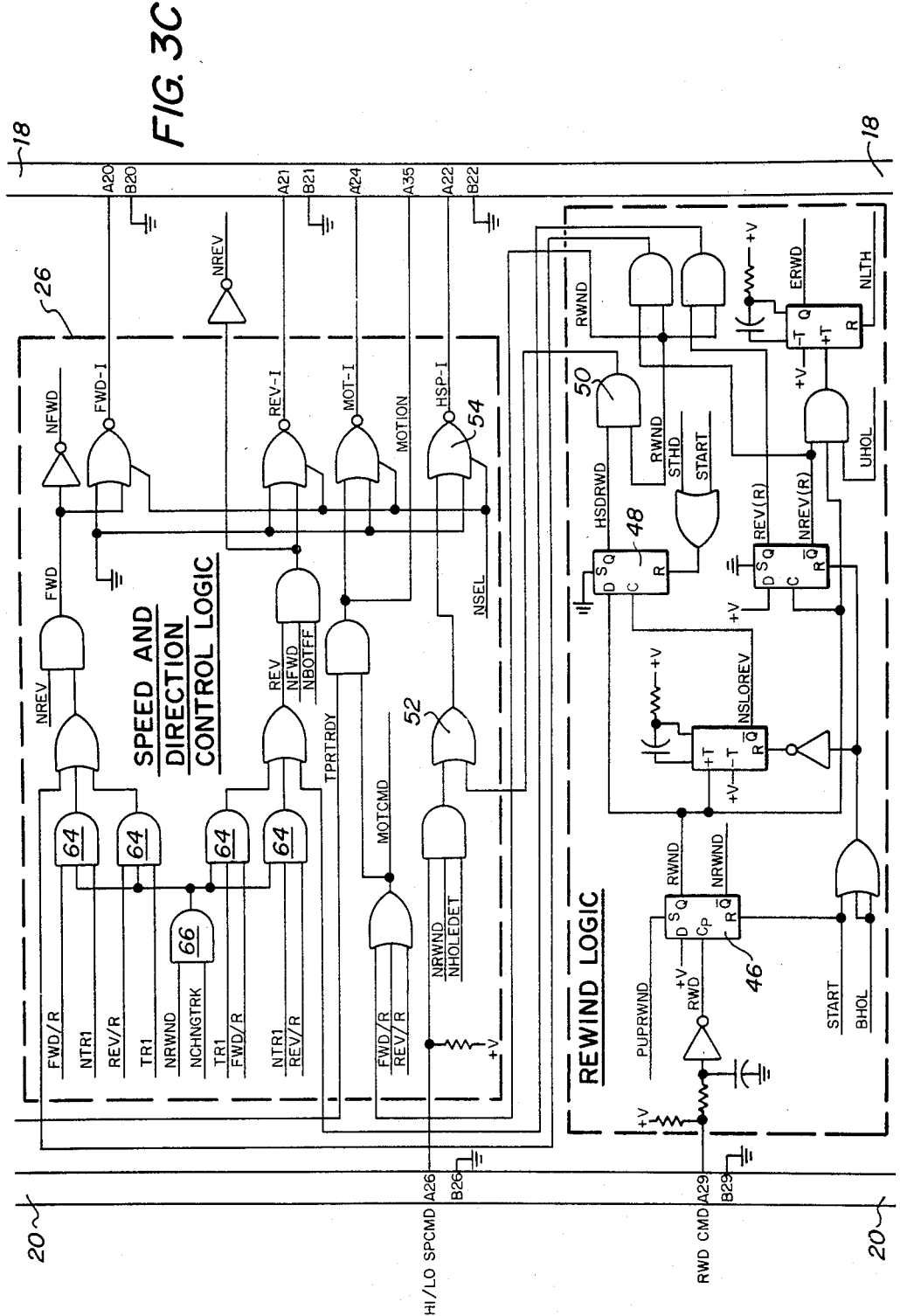
Figure 3D:
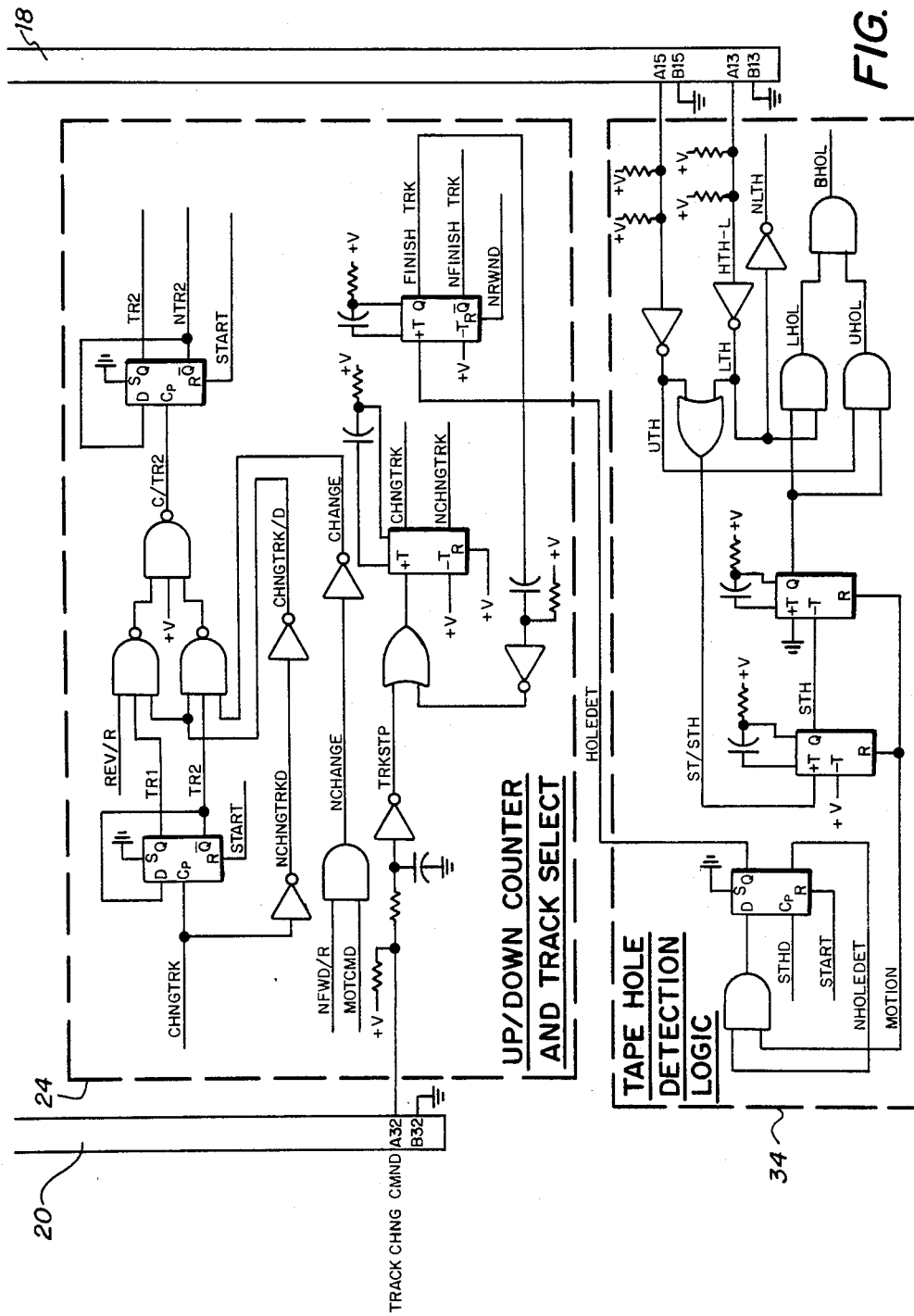

Up-down counter 24 is used to select a track, (see FIG. 3D). When recording in the forward direction, the operations counter will be such that when EOT (end of tape) is reached, the unit would pass through the end of tape marked "turnaround", reverse the direction of the tape and continue to write while incrementing to track two. Similarly, upon reaching the end of track 2, the track counter is incremented and the tape direction is reversed to record in the forward direction. Up-down counter 24 has two fold function, the first function is to count up for recording forward and the second function is to count down when commanded in reverse. When the tape is read, the counter operates in the same manner, counting up for forward and down for reverse.

Speed and direction control circuit 26 is a logic circuit which decides which direction the drive should be going. The actual motion of the tape cartridge is transparent to the user. A forward command is issued and the tape could be moving in either direction depending on what track is being recorded. The speed and control logic decides which direction to move the tape, depending on what track it's on and what command is being issued at that particular time. Furthermore, it decides when to operate at high speed. The only time high speed motion is used is in the rewind command. When the rewind command is issued, the speed and control logic senses the end of tape or beginning of tape hole vicinity and motion is accelerated to high speed in order to effect a short rewind time.

Circuit 28 is a latch which allows for the servo forward, the servo reverse and the reset command to pass through as long as the tape is not in a hole detect region.

A hole detect region is defined as the tape having passed an early warning hole and the tape is in the process of turning around. A hole detect signal stays true until the tape is out of that turnaround region, but when the tape approaches a hole detect region, latch 28 goes high and it holds the last set of commands. Command changes will not be recognized while the tape is in a turn around region. Reset, servo forward and servo reverse are latched out while the tape is in turnaround.

AND gate 30 is a gate which issues a signal called tape transport ready (TPRTRDY) the signals necessary to generate transport ready are bulb signals (BLB) from a light source located in the recorder (not shown) which says that the lamp inside the tape drive is on and good; CIP signal which says the cartridge is in place and power ready (PWRRDY). The transport ready signal (TPRTRDY) indicates that tape drive 18 is ready. TPRTRDY is used inside the controller to enable other signals.

Rewind logic 32 receives input of rewind command (RWDCMD) and a power up signal (PUP). This unit will rewind automatically when the power is turned on. It is essential to the recording system of the present invention that the tape first be rewound because that establishes a reference point on the tape to work from. There is no way of knowing where the tape is positioned when a new cartridge is put in place. The tape may or may not be at rewind. In order to establish a known initial condition, the tape is rewound and the track counter is set to a predetermined condition at track zero, and beginning of tape is set. Once that point is established, further controls can be done in a logical way.

Tape hole detection circuit 34 receives two signals from tape drive 18, upper tape hole (UTH) and lower tape hole (LTH). They are different combinations of pairs of tape holes and they are defined as upper and lower as the tape is viewed. Coming from the tape hole logic, the signals issued from the tape hole detection logic are starting at the bottom of block seven, some tape hole (STHL) upper hole, (UHOL) and lower hole (LOL) and both holes (BHOL). Since tape hole signals indicate that a tape hole has been detected, either upper or lower, defining particular locations, and indicate the occurance of both tape holes. The tape hole detection logic 34 receives a motion command (MOTION) as an input. MOTION indicates some motion command is present. When the tape is not moving, there is no need for recognition of tape hole signals. This is due to the possibility that something may cause the lamp detector, or hole detector to blink such as when a new tape is being loaded. To prevent false indications of hole detection, the recognition of holes in the tape is prohibited unless a motion command is present.

Status circuit 36 is simply a driver that relays the status information from tape drive 18 to the host, which in the preferred embodiment is a remote data acquisition system (not shown), which is used to control tape drive 18. Input from connector 20 are status signals comprising two track bits (TR1 and TR2) which define that track is being recorded or read. A return signal (SELECT) which tells the host that the unit has been selected, EOT and BOT signals, (end of tape and beginning of tape), rewind (RWD) which is true when the unit is in rewind and write protect which is true when the cartridge has been protected against writing.

Power up and detection circuit 38 is used to initialize the OBS unit (this may be done by a real time indication). PUP is a pulse which is defined as power up. When it is switched on for the first time, PUP generates a short pulse which initializes the controller 14 and formatter 12. In a coldstart position, the PUP signals transition is detected and from that, power ready (PWRRDY) is generated (see FIG. 3B). The three signals, reset, (RESET), end rewind (ERWD) and power up (PUP) all generate a signal called START which is a pulse which is used to initialize additional functions in such as flip flops in the preferred embodiment. The other signals, a power up (PUP) and plus five volt switched (+5 SWITCHED) are used to generate the power ready term (PWRRDY).

Referring now to FIGS. 3A to 3D, the circuits of FIG. 2 are illustrated in schematic form. For the sake of clarity, selected connections have been terminated on the drawings. Connections with the same name are the same connection, for example PUPRWND of FIG. 3A is the same connection as PUPRWND of FIG. 3C. FIG. 4 is an illustration of how FIGS. 3A through 3D should be placed for a complete system diagram.

Miscellaneous command circuit 22 receives a select command through connector 20 from a microprocessor unit (not shown) which initiates the entire system. All commands are inhibited when the unit is not selected. The select command is essential to enable any further commands to be issued to tape drive 18. The select command is processed through inverters 40 and NOR gate 42 as illustrated in the schematic diagram and output to tape drive 18.

Also illustrated in FIG. 3A are latch circuits 44 which are activated by the power up signal also received through connector 20. Latch circuits 44 produce a rewind signal which is used to set latch 46 of rewind logic 32 illustrated in FIG. 3C. Latch circuit 46 produces a rewind command which is processed through latch 48 AND circuit 50 and input to speed and direction control logic circuit 26. The signal is processed through OR gate 52 and OR gate 54 to issue a rewind command to tape drive 18.

Referring to FIG. 3B, power up detection and initialization circuit 38 is illustrated as receiving signals from tape drive 18 to produce a power ready signal through inverters 56. Initialization circuit 38 also receives three signals to OR gate 58 any of which will set latch 60 of status logic 36. If either of the units is reset, start rewind command is given where the unit is energized, OR gate 58 will produce a signal to reset latch 60 which will initiate rewinding of the tape recorder with end of tape, fast forward signal issued by latch 60 NOR gate 62. Thus when the remote unmanned seismic recorder unit 10 is energized for recording, the tape will be automatically rewound to its predetermined starting point which in the preferred embodiment is the beginning of track 1.

As indicated previously, latch circuit 28 is used to hold forward, reverse and reset commands whenever the tape is at one of its ends or a hold detect region.

Referring to FIG. 3C, speed and direction control logic circuit 26 is illustrated as a series of AND gates, OR gates and inverters. Essential to the operation of AND gates 64 is a true signal from the output of AND gate 66 which is produced whenever the recorder is not in rewind and not changing track. Whenever the tape is in a rewind condition or is in the process of changing track, all motion controlled by speed and direction control logic circuit 26 is prohibited until either of these functions is complete. As illustrated in circuit 26, an indication of track 1 requires recording in one direction while an indication of not track 1 requires recording in the other direction. The acronym TR 1 is used to designate tracks 1 and 3 while the acronym NTR 1 is used to indicate tracks 2 and 4. Tracks 1 and 3 are recorded in a direction from left to right while tracks 2 and 4 are recorded in a forward direction defined as right to left. Although recording from right to left is defined as recording in the forward direction, the acronym REV (reverse) is used since the tape is being driven in a direction reverse to the direction it is driven for track 1. The direction of rotation, forward or reverse, may be obtained by monitoring the rotational direction of the tape drive in the recorder unit. This may be done by many methods known in the art such as monitoring the priority of the current fed to the tape drive.

Referring to FIG. 3D, a schematic diagram of up down counter and track selection circuit 24 is illustrated. As indicated previously, a series of latches AND gates, NAND gates and inverter are used to count tracks whenever the end of tape is reached and the track is changed. The counters count up when recording forward and count down when recording in reverse.

Further details of the controller system of the present invention as supplied on FIGS. 3A through 3D are presented so that one skilled in the art can readily make the system of the present invention.

In operation, controller unit 10 is in a standby condition and at a predetermined time is energized. This may be accomplished through a central processing unit (not shown) or a central processing unit with a clock pulse generator, which may give a real time indication (not shown) as is preferred. However, a device as simple as a mechanical or electric timer may be used to energize the system. As alluded to previously, the purpose of maintaining the controller and tape drive in a standby condition is to reduce total power consumption. By segregating a plurality of components into those that necessarily require continuous power and those which may be operated in a standby condition until energized, a significant power consumption saving can be realized.

At power energization, PUP signal is received by circuit 38 which initiates a rewind command as previously described since the beginning of tape for track 1 has been selected as the starting point for the preferred embodiment. However, any reasonable position may be selected, such as the end of tape track 4, with minor modifications such as having the tape wind forward until the end of tape track 4 is reached.

Seismic data is recorded on the tape until the end of the track being recorded is reached. As indicated with the description of selection circuit 24, the end of tape is detected by the holes in the recording tape supplied by the manufacturer and the track is changed along with the direction of recording.

During the entire recording operation, speed and direction control circuit 26 is monitoring which track is being recorded, the speed the recorder is moving and the direction being recorded, as indicated previously, recording in the forward direction is on one direction for track 1 and the opposite direction for track 2, all of which is controlled by circuit 26. Even though the recording direction is reversed for track 2 compared to track 1, a forward direction is indicated to the user.

Thus, the foregoing description of the preferred embodiment teaches a controller unit which reduces power consumption by segregating power requirements, provides a predetermined starting point for recording by rewinding the recording tape to the beginning of tape track 1, provides a method for continuous recording by detecting the end of track, changing to the next track and reversing recording direction, and monitors the track being recorded and the rotational direction of the tape.

While the present invention has been described by way of preferred embodiment, it is to be understood that the foregoing was by way of illustration only and that the present invention should not be limited thereto but only by the scope of the following claims.

What is claimed is:

1. A method for minimizing total power consumption in a remote unmanned multi track recording unit in an ocean bottom seismometer having a power supply, a recorder and a plurality of electrically operated functions comprising:
   segregating the recorder and plurality of electrically operated functions into a first group having continuous power requirements consisting of very low power circuits and a second group having non-continuous power requirements,
   connecting said first group to said power supply,
   retaining tape movement direction and track number by said first group having continuous power requirements,
   connecting said second group to said power supply through a timing circuit having a standby condition wherein power flow is blocked when said second group is not in operation and an energized condition wherein power flow is permitted when said second group is in operation,
   maintaining said timing circuit in said standby condition, and
   changing said timing circuit from said standby condition to said energized condition at a predetermined time.

2. The method according to claim 1 wherein said connecting said second group step includes the step of connecting a central processor unit to said power supply to distribute said power to said second group.

3. The method according to claims 1 or 2 wherein said changing step includes the step of supplying a real time indication to select said predetermined time.

4. A power control circuit for use with a seismic data multi track tape recorder system and a power supply in an ocean bottom seismometer comprising:
   very low power circuits for retaining information consisting of tape movement direction and track number,
   first distribution means connected to the power supply for providing continuous power to said very low power circuits,
   second distribution means connected to the power supply and to additional portions of the tape recorder system for providing power to said additional portions of the tape recorder system said second distribution means having a standby state wherein no power is provided and an energized state wherein power is provided, and
   selective means connected to said second distribution means for changing said second distribution means from said standby state to said energized state.

5. The power control circuit of claim 4 wherein said selective means includes:
   timing means for changing said first distribution means from said standby state to said energized state at a predetermined time.

6. The power control circuit of claim 5 wherein said timing means includes clock means for providing a real time indication.

* * * * *